US012263567B1

(12) United States Patent
Li et al.

(10) Patent No.: US 12,263,567 B1
(45) Date of Patent: Apr. 1, 2025

(54) CIRCLE-PRODUCING PLIER

(71) Applicants: Xu Li, Beijing (CN); Ruipu Lv, Zhejiang (CN)

(72) Inventors: Xu Li, Beijing (CN); Ruipu Lv, Zhejiang (CN)

( * ) Notice: Subject to any disclaimer, the term of this patent is extended or adjusted under 35 U.S.C. 154(b) by 0 days.

(21) Appl. No.: 18/929,093

(22) Filed: Oct. 28, 2024

Related U.S. Application Data

(63) Continuation of application No. PCT/CN2024/117119, filed on Sep. 5, 2024.

(30) Foreign Application Priority Data

Aug. 19, 2024 (CN) ......................... 202411140434.1

(51) Int. Cl.
*B21F 1/00* (2006.01)
*B25B 7/12* (2006.01)
*B25B 7/22* (2006.01)

(52) U.S. Cl.
CPC ................ *B25B 7/22* (2013.01); *B21F 1/002* (2013.01); *B25B 7/12* (2013.01)

(58) Field of Classification Search
CPC ........... B25B 7/12; B25B 7/22; B25B 25/005; B21D 11/06; B21F 1/002; B21F 1/006;
(Continued)

(56) References Cited

U.S. PATENT DOCUMENTS

| | | | | |
|---|---|---|---|---|
| 7,032,627 | B1 | 4/2006 | Sheriff | |
| 2011/0041583 | A1* | 2/2011 | Sheriff ...................... | B21F 1/00 72/409.13 |
| 2015/0321243 | A1* | 11/2015 | Farnum ................... | B21F 45/00 140/102.5 |

FOREIGN PATENT DOCUMENTS

| | | | |
|---|---|---|---|
| CN | 201677256 U | 12/2010 | |
| CN | 204130893 U | 1/2015 | |

(Continued)

OTHER PUBLICATIONS

International Search Report for PCT Patent application No. PCT/CN2024/117119, dated Dec. 11, 2024.

(Continued)

*Primary Examiner* — Robert J Scruggs
(74) *Attorney, Agent, or Firm* — Maschoff Brennan

(57) ABSTRACT

The present application relates to the technical field of circle-producing devices, and discloses a circle-producing plier. The circle-producing plier comprises: a first plier arm, wherein one end of the first plier arm is provided with a fixing plate, a plurality of molding columns of different diameters are connected on the fixing plate, a mounting plate is rotatably connected on each of the molding columns, a molding protrusion is connected on each mounting plate, and a molding gap for molding a wire is arranged between the molding protrusion and a corresponding molding column; and a second plier arm, wherein the second plier arm is rotatably connected to the first plier arm, the second plier arm is provided with a connecting part, the connecting part is configured to be rotatably switchable between an initial position and a molding position, the connecting part is in motion-transmission connection with a plurality of mounting plates through a motion-transmission assembly, and in a process of the connecting part rotating from the initial position to the molding position, the molding protrusion molds a wire located in the molding gap onto the corresponding molding column to form an O ring. The present application discloses a circle-producing plier which can improve working efficiency and bend a wire into O rings of various sizes.

10 Claims, 7 Drawing Sheets

(58) Field of Classification Search
CPC .. B21F 1/008; B21F 1/06; B21F 11/00; B21F 23/00; B21F 37/00; B21F 37/02; B21F 45/00; H02K 3/18; H01R 43/033
See application file for complete search history.

(56) References Cited

FOREIGN PATENT DOCUMENTS

| | | | |
|---|---|---|---|
| CN | 207265396 | U | 4/2018 |
| CN | 211151041 | U | 7/2020 |
| CN | 212495053 | U | 2/2021 |
| CN | 112436363 | A | 3/2021 |
| CN | 116565668 | A | 8/2023 |

OTHER PUBLICATIONS

Written Opinion of the International Search Authority for PCT Patent application No. PCT/CN2024/117119, dated Dec. 11, 2024.

* cited by examiner

CIRCLE-PRODUCING PLIER

CROSS REFERENCE TO RELATED APPLICATIONS

The present application is a continuation of International Application No. PCT/CN2024/117119 filed on Sep. 5, 2024, which claims priority to Chinese Patent Application No. 202411140434.1 filed on Aug. 19, 2024. Both applications are incorporated by reference herein in their entireties.

TECHNICAL FIELD

The present application relates to the technical field of circle-producing devices, in particular to a circle-producing plier.

BACKGROUND

When some ornaments like bracelets, earrings and necklaces are strung together, various beads are generally manually connected with aluminum wire or soft copper wire and other soft wire. After the beads are connected, an O ring needs to be bent in the head or tail of the soft wire to prevent the beads from slipping off, and the O ring plays a role of limiting beads or hanging beads.

In related technologies, the O ring can only be bent by manually using several pliers such as sharp nose pliers, round nose pliers and cutting pliers. The produced O ring is non-standard, the production speed is slow, the wire cannot be bent into O rings of various sizes with only one tool, and the working efficiency is low.

SUMMARY OF THE INVENTION

In view of this, the present application provides a circle-producing plier that improves working efficiency and allows bending of the wire into O rings of various sizes.

The present application provides a circle-producing plier, including:

- a first plier arm with one end provided with a fixing plate, wherein a plurality of molding columns of different diameters are connected on the fixing plate, a mounting plate is rotatably connected on each of the molding columns, a molding protrusion is connected on each mounting plate, and a molding gap for molding a wire is arranged between the molding protrusion and a corresponding molding column; and
- a second plier arm rotatably connected to the first plier arm, wherein the second plier arm is provided with a connecting part, the connecting part is configured to be rotatably switchable between an initial position and a molding position, the connecting part is in motion-transmission connection with a plurality of mounting plates through a motion-transmission assembly, and in a process of the connecting part rotating from the initial position to the molding position, the molding protrusion molds a wire located in the molding gap onto the corresponding molding column to form an O ring.

Beneficial effects are as follows: the wire is placed in a molding gap to pull the first plier arm and the second plier arm, such that the connecting part on the second plier arm rotates from an initial position to a molding position, and during rotation, the connecting part drives a mounting plate to rotate through a motion-transmission assembly, such that a molding protrusion rotates with a molding column as an axis, the molding protrusion bends and molds the wire located in the molding gap onto the molding column to form an O ring, and the operation is performed with no need of adopting a plurality of tools at the same time and is easier. A plurality of molding columns of different diameters are connected on the fixing plate, to mold into a plurality of O rings of different diameters and improve the working efficiency.

In one optional embodiment, a shearing member is further included, wherein the shearing member includes a first shearing part and a second shearing part, the first shearing part is connected on the fixing plate, the second shearing part is connected to the connecting part, and when the connecting part is located at the initial position, a shearing gap configured to shear a wire is formed between the first shearing part and the second shearing part, and in a process of the connecting part rotatably switching from the initial position to the molding position, the first shearing part and the second shearing part cut the wire.

Beneficial effects are as follows: when the connecting part is in the initial position, the wire is located within the shearing gap, the shearing member can cut off excessive wire, and meanwhile, the molding protrusion wraps and molds the wire onto the molding column.

In one optional embodiment, the first shearing part includes a plurality of first shearing plates, the plurality of first shearing plates are connected to the fixing plate and are arranged in one-to-one correspondence with the plurality of molding columns; and

- the second shearing part includes a plurality of second shearing plates, the plurality of second shearing plates are connected to the connecting part and are arranged in one-to-one correspondence with the plurality of first shearing plates, and a shearing gap is formed between each pair of correspondingly arranged first shearing plate and second shearing plate.

Beneficial effects are as follows: one first shearing plate and one second shearing plate corresponding thereto form a group of shearing knives, and the plurality of groups of shearing knives are arranged corresponding to a plurality of molding columns and can cut off wire of excessive length.

In one optional embodiment, the distance between a shearing end of a first shearing plate and a corresponding molding protrusion is less than or equal to the perimeter of a cross segment of the corresponding molding column.

Beneficial effects are as follows: the cut wire can be ensured to exactly wrap around the molding column by one circle, and the cut wire will not be too long or too short, so as to ensure specification of the O ring.

In one optional embodiment, the motion-transmission assembly includes a plurality of gear wheels and a curved toothed plate, the plurality of gear wheels are correspondingly rotatably connected on the plurality of molding columns, the plurality of mounting plates are correspondingly connected to the plurality of gear wheels, the curved toothed plate is connected to the connecting part and meshes with the plurality of gear wheels, and the plurality of second shearing plates are connected to the curved toothed plate.

Beneficial effects are as follows: the curved toothed plate can drive a plurality of gear wheels to rotate simultaneously, and the plurality of gear wheels can drive a plurality of mounting plates to rotate simultaneously to form a plurality of O rings of different diameters, thereby improving the production efficiency; through the motion-transmission mode of gear wheels and a curved toothed plate, the motion-transmission precision is high, and the specification of the O rings will not be affected.

In one optional embodiment, the plurality of mounting plates are provided with a plurality of mounting holes corresponding to the plurality of molding columns, and the plurality of mounting holes are correspondingly rotatably connected on the plurality of molding columns.

In one optional embodiment, a plurality of limiting blocks are further included, wherein the plurality of limiting blocks are connected to the fixing plate and are arranged in one-to-one correspondence with the plurality of molding columns, a mounting gap is formed between each limiting block and a corresponding molding column, and the mounting gap is communicated with the molding gap.

Beneficial effects are as follows: the wire passes through the mounting gap, the molding gap and the shearing gap in sequence, the corresponding first shearing plate and second shearing plate cut the wire to a suitable length, the wire arranged from the molding protrusion to the shearing end of the first shearing plate is set to be a first segment, while the rest of the wire is set to be a second segment; the molding protrusion rotates along with the mounting plate and winds and molds the first segment of the wire on the molding column, and the second segment of the wire abuts against a limiting block, and the limiting block supports the second segment of the wire, such that the first segment of the wire forms an O ring; the limiting block is away from the rotating path of the molding protrusion, and does not affect the rotation of the molding protrusion along with the mounting plate.

In one optional embodiment, the limiting block is provided with a limiting surface, and the limiting surface is configured to position the wire in place.

In one optional embodiment, the molding protrusion is provided with a guiding surface, and the molding gap is formed between the guiding surface and a corresponding molding column.

In one optional embodiment, an elastic member is further included, wherein one end of the elastic member is connected to the first plier arm, and the other end of the elastic member is connected to the second plier arm, and under the action of the elastic member, the connecting part has a tendency of rotating in a direction from the molding position to the initial position.

Beneficial effects are as follows: After the wire is processed, the first plier arm and the second plier arm are released, and under the action of the elastic member, the connecting part rotates to the initial position, ready to process the next wire.

BRIEF DESCRIPTION OF THE DRAWINGS

In order to more clearly illustrate technical solutions in the specific embodiments of the present application or in the prior art, the accompanying drawings that need to be used in the description of the specific embodiments or the prior art are introduced briefly below, and apparently, the accompanying drawings in the following description are some embodiments of the present application, and for those skilled in the art, other accompanying drawings can be obtained according to these drawings without any creative labor.

Figure 1:
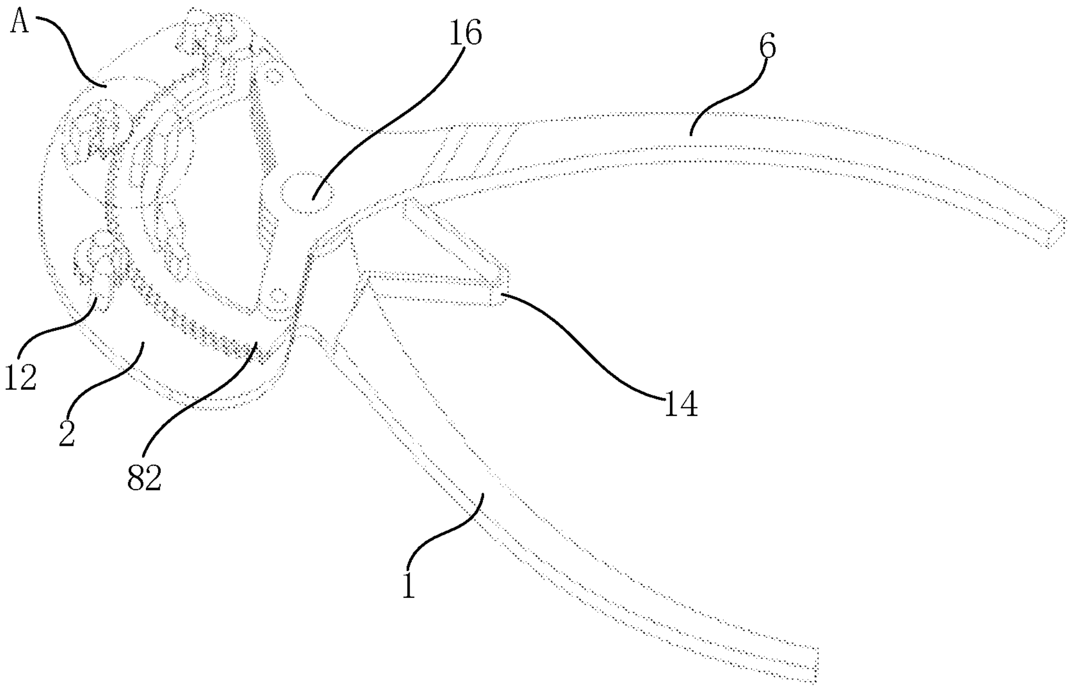
FIG. 1 is a structural schematic diagram of a circle-producing plier of an embodiment of the present application.
Figure 2:
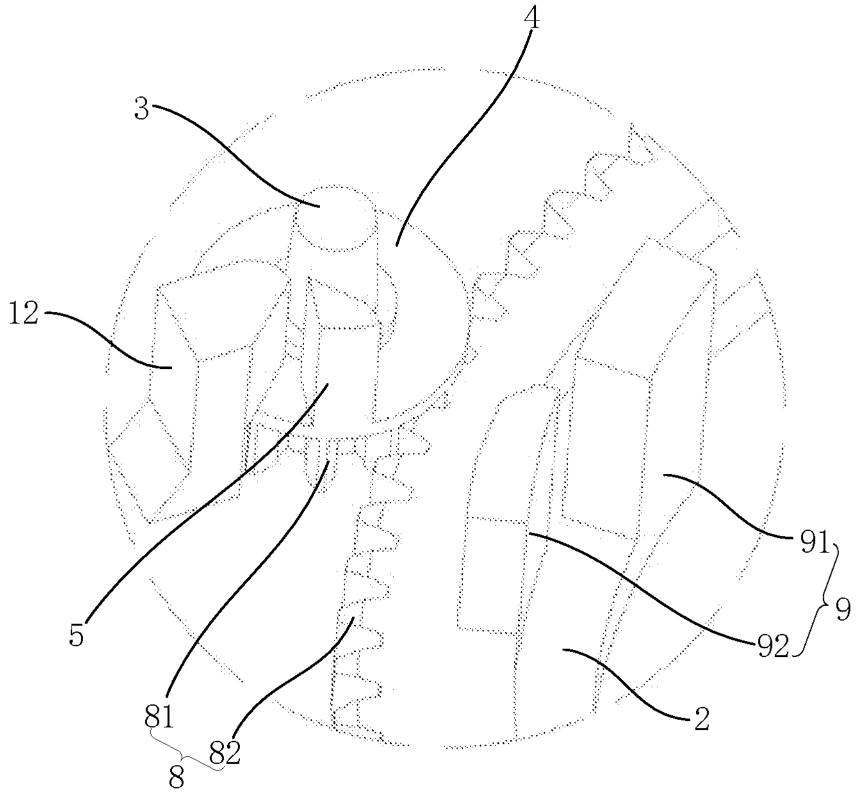
FIG. 2 is a partially enlarged schematic diagram of A in FIG. 1.
Figure 3:
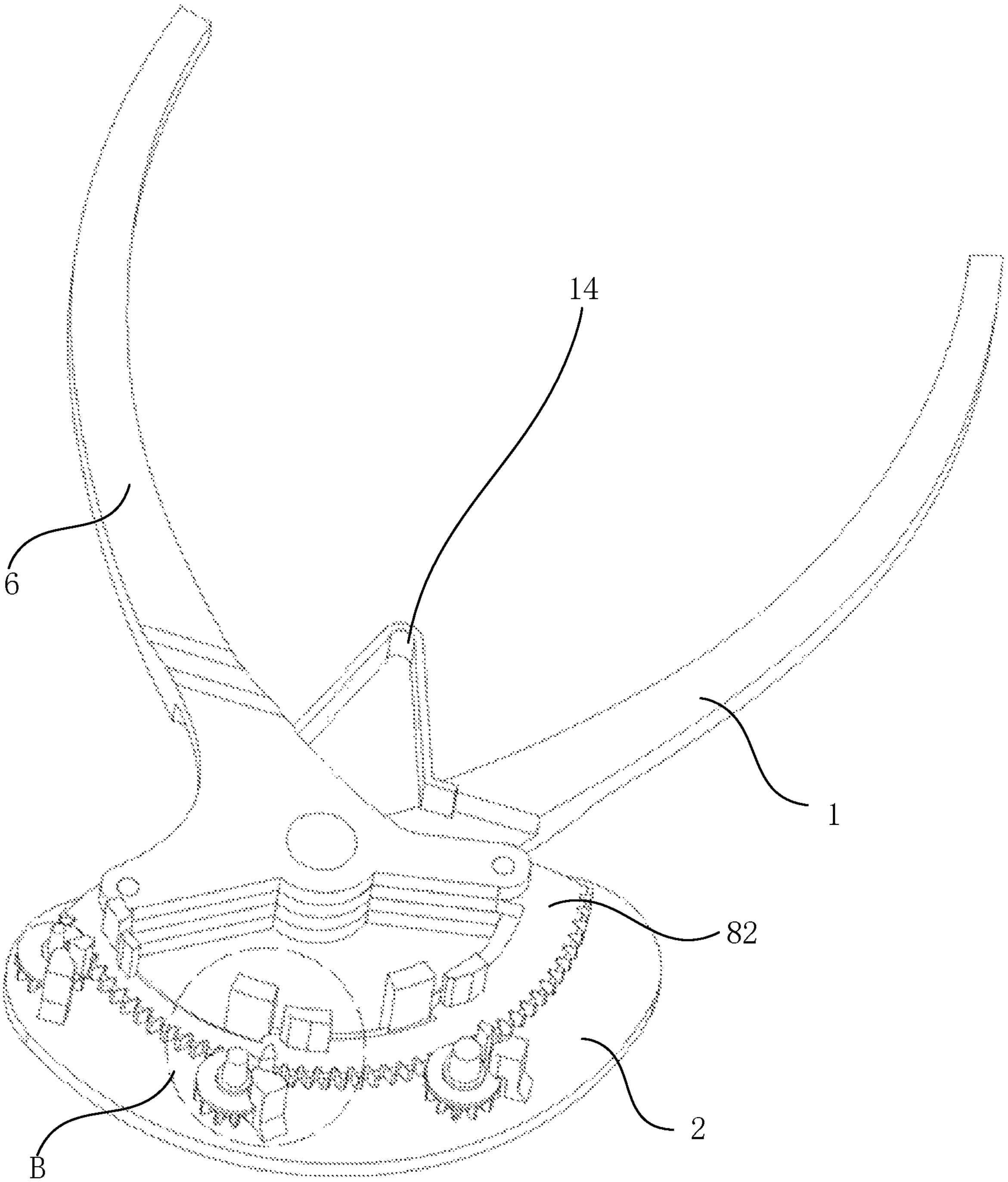
FIG. 3 is a structural schematic diagram of another angle of a circle-producing plier of an embodiment of the present application.

Reference numerals in the figures:

1, first plier arm; 2, fixing plate; 3, molding column; 4, mounting plate; 5, molding protrusion; 51, guiding surface; 6, second plier arm; 7, connecting part; 8, motion-transmission assembly; 81, gear wheel; 82, curved toothed plate; 9, shearing member; 91, first shearing plate; 92, second shearing plate; 10, molding gap; 11, shearing gap; 12, limiting block; 121, limiting surface; 13, mounting gap; 14, elastic member; 15, connecting hole; 16, rotating connection member; 17, fixing connection member.

DETAILED DESCRIPTION

In order to make the purpose, technical solutions and advantages of the embodiments of the present application clearer, technical solutions in the embodiments of the present application will be described clearly and completely below in combination with the accompanying drawings in the embodiments of the present application, and apparently, the described embodiments are merely a part but not all of the embodiments of the present application. Based on the embodiments in the present application, all the other embodiments obtained by those skilled in the art without any creative labor shall all fall within the protection scope of the present application.

Embodiments of the present application will be described below in combination with FIG. 1 to FIG. 8.

According to embodiments of the present application, a circle-producing plier is provided, including:

- a first plier arm 1, wherein one end of the first plier arm 1 is provided with a fixing plate 2, a plurality of molding columns 3 of different diameters are connected on the fixing plate 2, a mounting plate 4 is rotatably connected on each of the molding columns 3, a molding protrusion 5 is connected on each mounting plate 4, and a molding gap 10 for molding a wire is arranged between the molding protrusion 5 and a corresponding molding column 3; and
- a second plier arm 6 rotatably connected to the first plier arm 1, wherein the second plier arm 6 is provided with a connecting part 7, the connecting part 7 is configured to be rotatably switchable between an initial position and a molding position, the connecting part 7 is in motion-transmission connection with a plurality of mounting plates 4 through a motion-transmission assembly 8, and in a process of the connecting part 7 rotating from the initial position to the molding position, the molding protrusions 5 molds a wire located in the molding gap 10 onto the corresponding molding column 3 to form an O ring.

The wire is placed in a molding gap 10 to pull the first plier arm 1 and the second plier arm 6, such that the connecting part 7 on the second plier arm 6 rotates from an initial position to a molding position, and during rotation, the connecting part 7 drives a mounting plate 4 to rotate through the motion-transmission assembly 8, such that a molding protrusion 5 rotates with a molding column 3 as an axis, the molding protrusion 5 bends and molds the wire located in the molding gap 10 onto the molding column 3 to form an O ring, and the operation is performed with no need of adopting a plurality of tools at the same time and is easier. A plurality of molding columns 3 of different diameters are mounted on a fixing plate 2, to mold into a plurality of O rings of different diameters and improve the working efficiency.

Figure 5:
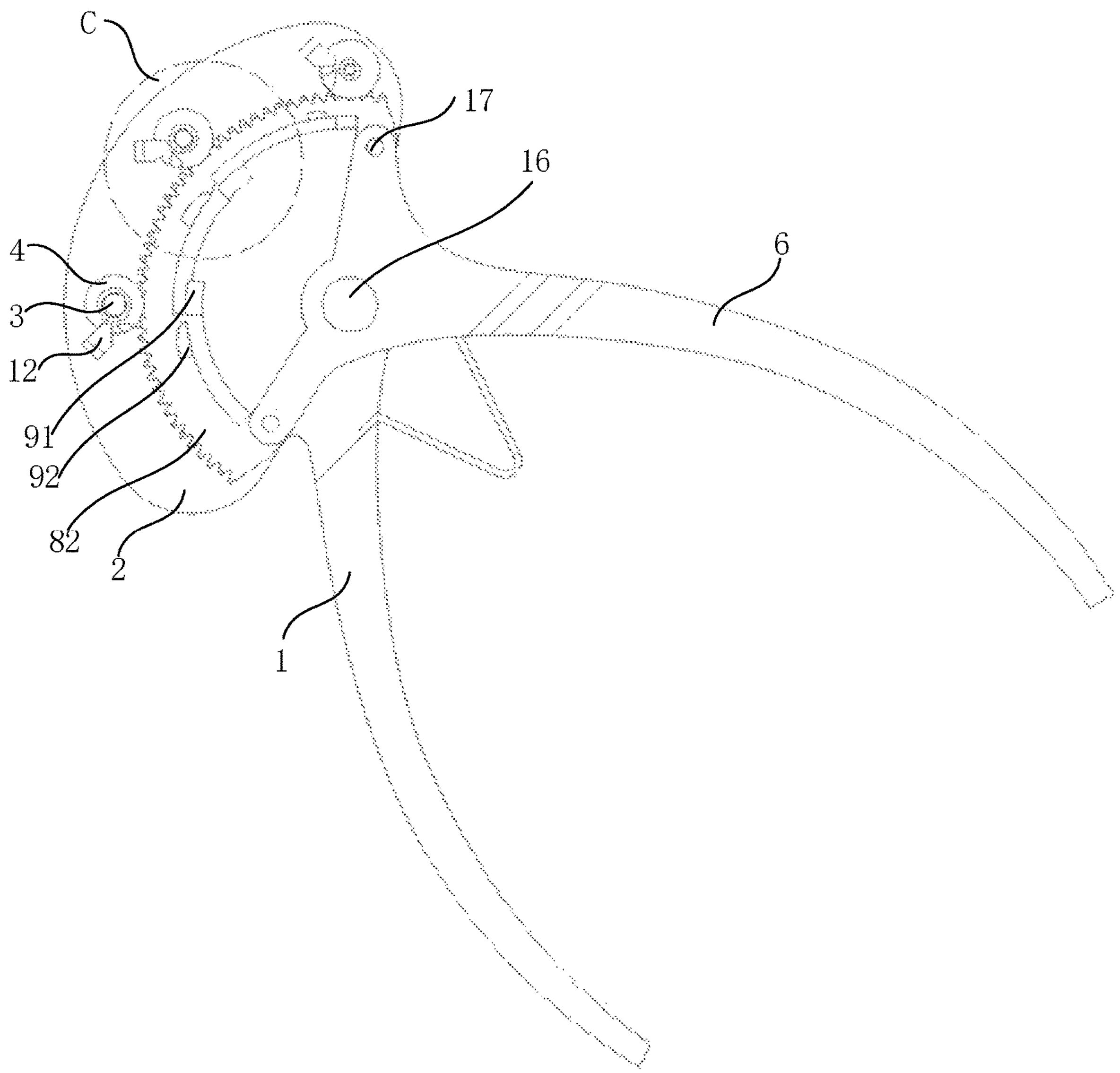
FIG. 5 is a top view of a circle-producing plier of an embodiment of the present application.
Figure 7:
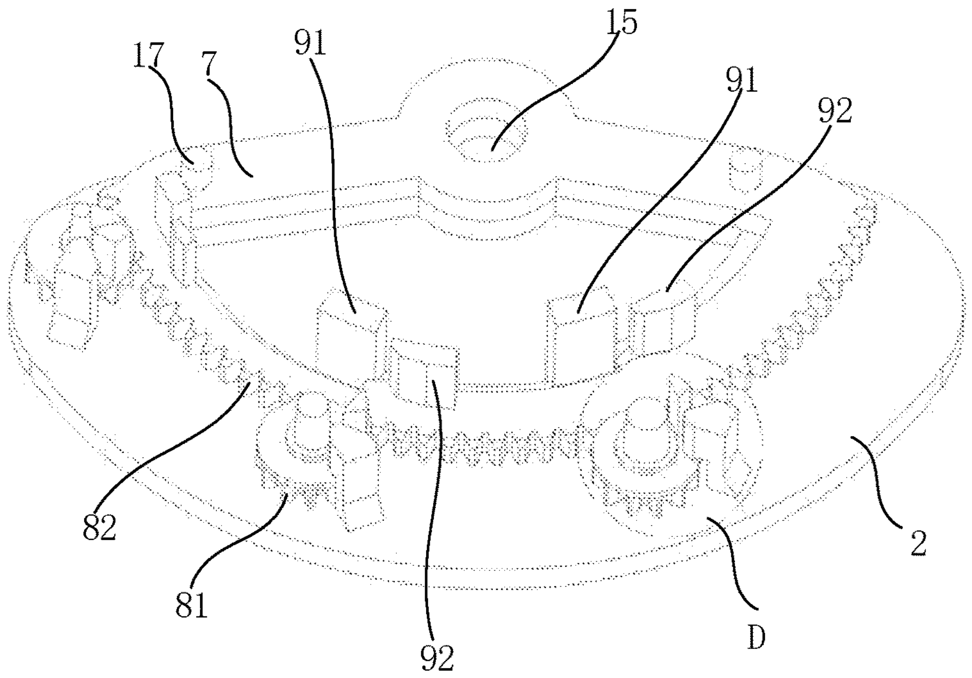
FIG. 7 is a partially structural schematic diagram of a circle-producing plier of an embodiment of the present application.
Figure 8:
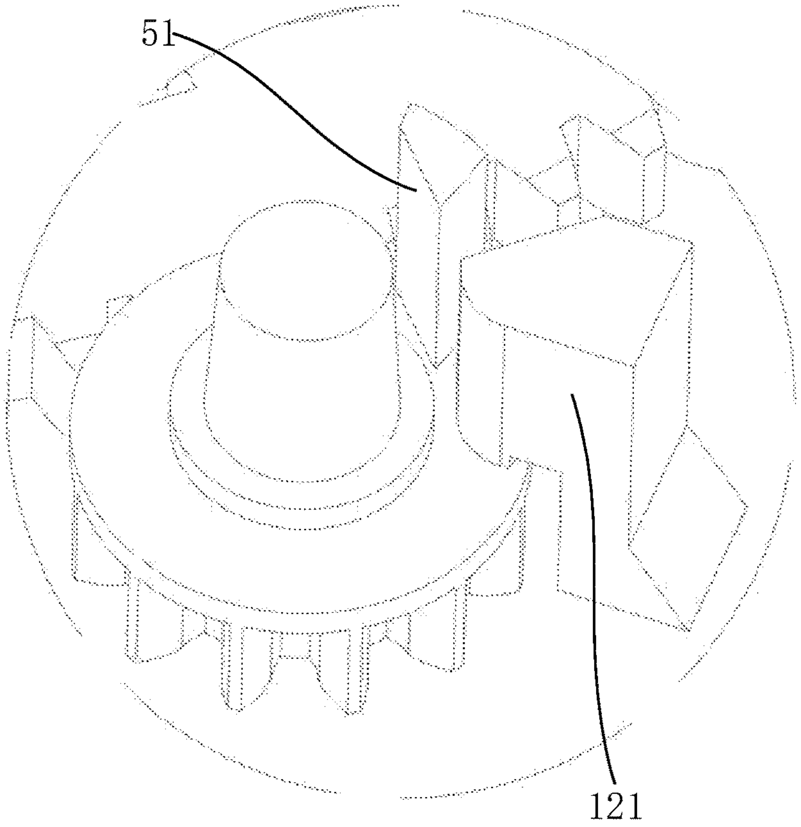
FIG. 8 is a partially enlarged schematic diagram of D in FIG. 7.

In some embodiments, as shown in FIG. 5 and FIG. 7, the connecting part 7 is fixedly connected to the second plier arm 6 through a fixing connection member.

In some specific embodiments, the connecting part 7 and the second plier arm 6 are correspondingly provided with fixing holes, and the fixing connection members 17 are correspondingly inserted onto the fixing holes for fixing the connecting part 7 and the second plier arm 6.

In some specific embodiments, the fixing connection member 17 may be selected from bolts or rivets with threads or expansive rivets.

In some embodiments, the first plier arm 1, the second plier arm 6 and the connecting part 7 are correspondingly provided with a connecting hole 15, and the first plier arm 1, the second plier arm 6 and the connecting part 7 are rotatably connected through the rotating connection member 16 which is inserted into the connecting hole 15.

In some specific embodiments, the rotating connection member 16 may be selected from hinge pins or rivets with threads or expansive rivets.

In some embodiments, a plurality of molding columns 3 of different diameters are fixed to the mounting plate 2.

In some embodiments, the molding protrusions 5 are fixed to the mounting plate 4.

In some embodiments, the fixing plate 2 is fixed to one end of the first plier arm 1.

Figure 4:
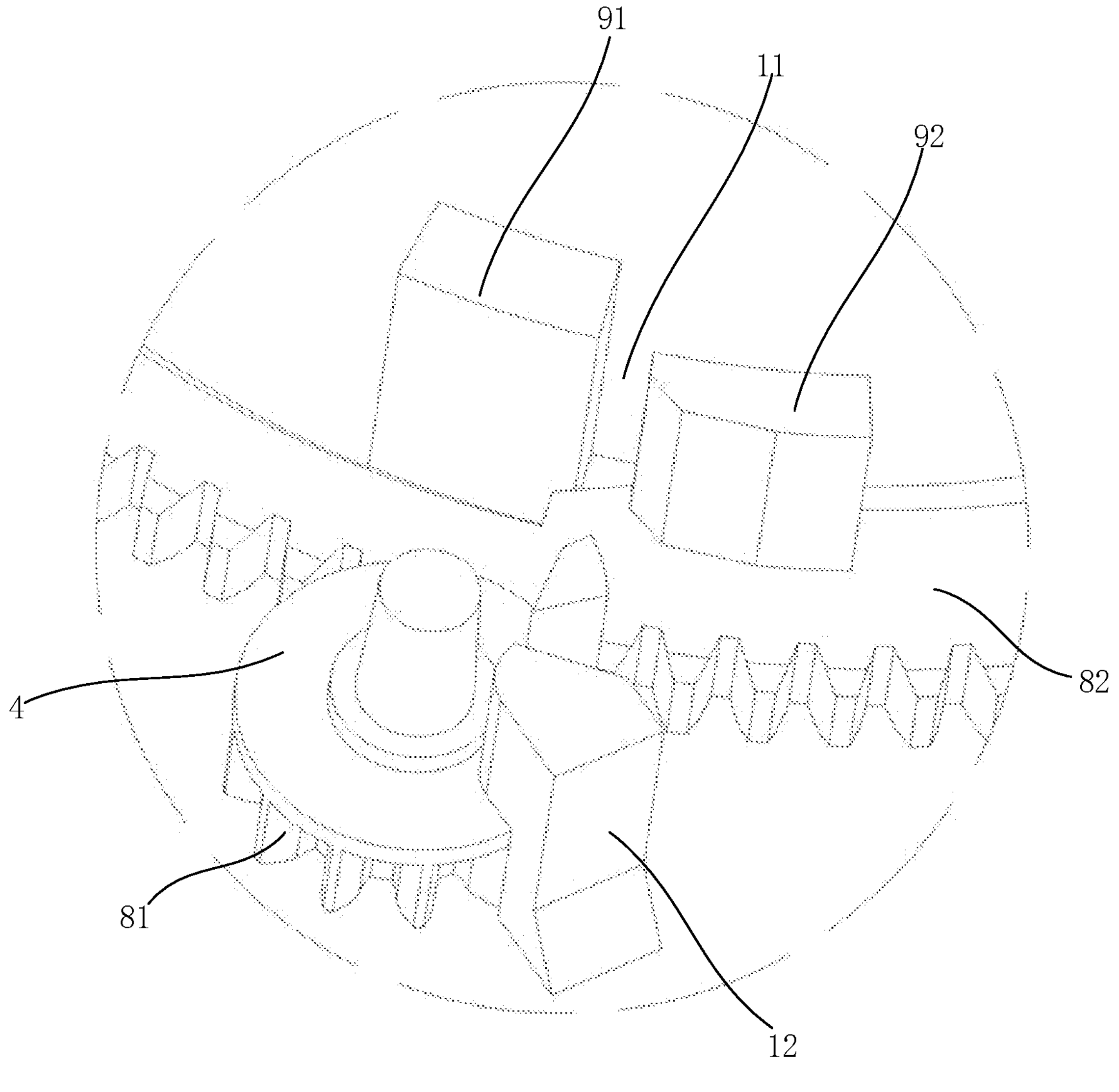
FIG. 4 is a partially enlarged schematic diagram of B in FIG. 3.
Figure 6:
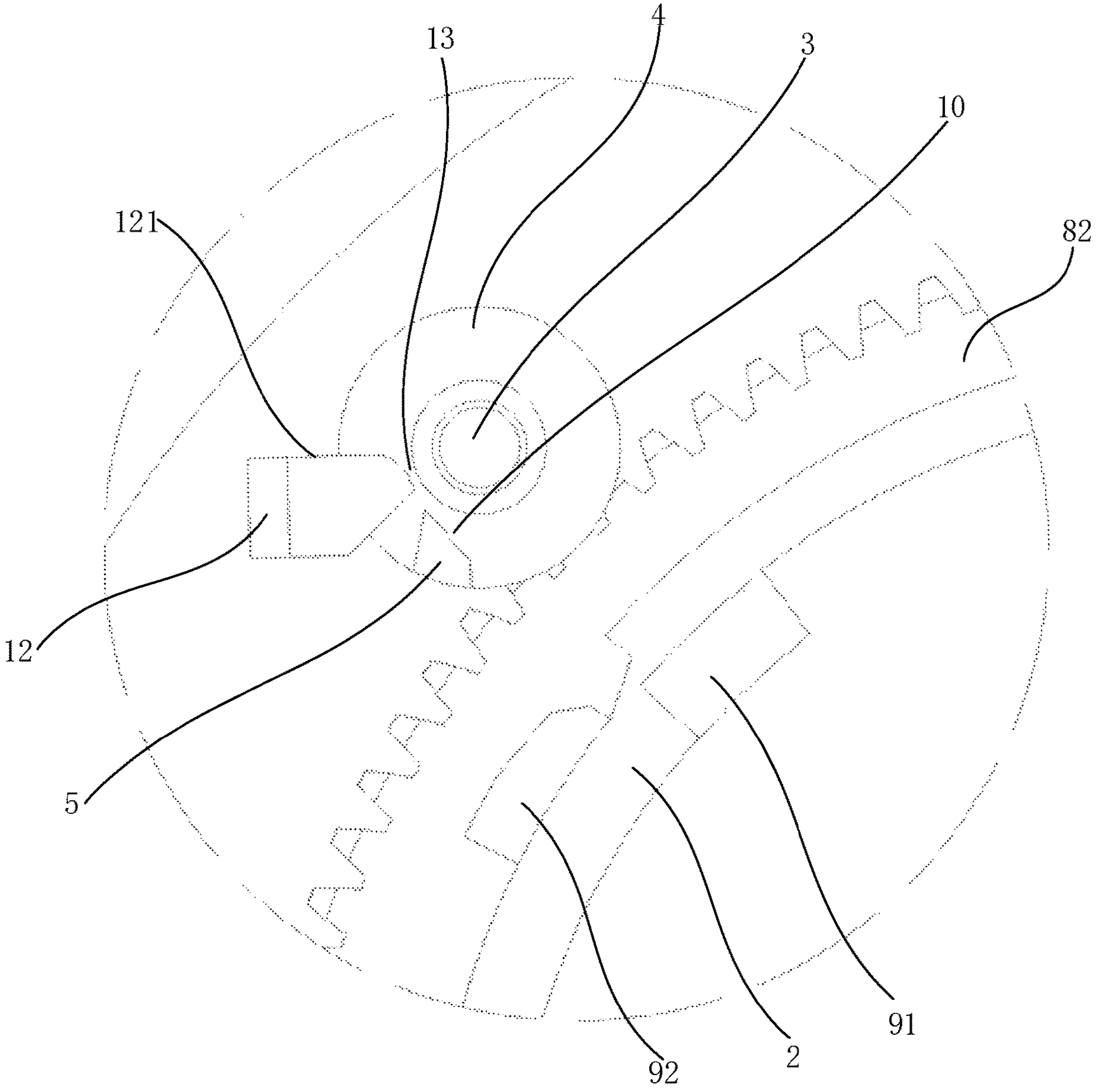
FIG. 6 is a partially enlarged schematic diagram of C in FIG. 5.

In one embodiment, as shown in FIG. 4, FIG. 6, and FIG. 7, a shearing member 9 is further included, wherein the shearing member 9 includes a first shearing part and a second shearing part, the first shearing part is connected to the fixing plate 2, the second shearing part is connected to the connecting part 7, when the connecting part 7 is located at an initial position, a shearing gap 11 configured to shear a wire is formed between the first shearing part and the second shearing part, and in a process of the connecting part 7 rotatably switching from the initial position to the molding position, the first shearing part and the second shearing part cut the wire.

As shown in FIG. 4, when the connecting part 7 is in the initial position, the wire is located within the shearing gap 11, and the shearing member 9 can cut off excessive wire, meanwhile, the molding protrusion 5 wraps and molds the wire onto the molding column 3.

In one specific embodiment, the first shearing part is fixed to the fixing plate 2, and the second shearing part is fixedly connected to the connecting part 7.

In one specific embodiment, the first shearing part is fixedly connected to the fixing plate 2 through welding or bonding; and the second shearing part is fixedly connected to the connecting part 7 through welding or bonding.

In one embodiment, the first shearing part includes a plurality of first shearing plates 91, the plurality of first shearing plates 91 are connected to the fixing plate 2 and are arranged in one-to-one correspondence with the plurality of molding columns 3; and the second shearing part includes a plurality of second shearing plates 92, the plurality of second shearing plates 92 are connected to the connecting part 7 and are arranged in one-to-one correspondence with the plurality of first shearing plates 91, and a shearing gap 11 is formed between each pair of correspondingly arranged first shearing plate 91 and second shearing plate 92.

One first shearing plate 91 and one second shearing plate 92 corresponding thereto form a group of shearing knives, and the plurality of groups of shearing knives are arranged corresponding to a plurality of molding columns 3 and cut off the wire of excessive length.

In one specific embodiment, the plurality of first shearing plates 91 are fixed to the fixing plate 2, and the plurality of second shearing plates 92 are fixedly connected to the connecting part 7.

In one specific embodiment, the plurality of first shearing plates 91 are fixed to the fixing plate 2 through welding.

In one embodiment, the distance between a shearing end of a first shearing plate 91 and a corresponding molding protrusion 5 is less than or equal to the perimeter of a cross segment of the corresponding molding column 3. The cut wire can be ensured to exactly wrap around the molding column 3 by one circle, and the cut wire will not be too long or too short, so as to ensure specification of an O ring.

In one embodiment, the motion-transmission assembly 8 includes a plurality of gear wheels 81 and a curved toothed plate 82, the plurality of gear wheels 81 are correspondingly rotatably connected on the plurality of molding columns 3, the plurality of mounting plates 4 are correspondingly connected to the plurality of gear wheels 81, the curved toothed plate 82 is connected to the connecting part 7 and meshes with the plurality of gear wheels 81, and the plurality of second shearing plates 92 are connected to the curved toothed plate 82.

The curved toothed plate 82 is fixedly connected to the connecting part 7, the plurality of second shearing plates 92 are fixedly connected to the curved toothed plate 82, the curved toothed plate 82 can simultaneously drive a plurality of gear wheels 81 to rotate, the plurality of gear wheels 81 can simultaneously drive the plurality of mounting plates 4 to rotate to form a plurality of O rings of different diameters, thereby improving the production efficiency; through the motion-transmission mode of the gear wheels 81 and the curved toothed plate 82, the motion-transmission precision is high, and the specification of the O rings will not be affected.

In one specific embodiment, the gear wheel 81 and a corresponding mounting plate 4 are integrally molded.

In one specific embodiment, the curved toothed plate 82 is in welded connection with or integrally molded to the connecting part 7.

In one specific embodiment, the plurality of second shearing plates 92 are fixedly connected to the curved toothed plate 82 through welding or the plurality of second shearing plates 92 are integrally molded with the curved toothed plate 82.

In some embodiments, the plurality of molding columns 3 are arranged along a radian direction of the curved toothed plate 82 and are vertically fixed to the mounting plate 2.

In one embodiment, the plurality of mounting plates 4 are provided with a plurality of mounting holes corresponding to the plurality of molding columns 3, and the plurality of mounting holes are correspondingly rotatably connected on the plurality of molding columns 3.

In some embodiments, the mounting plates 4 are circular plates.

In one embodiment, as shown in FIG. 6, a plurality of limiting blocks 12 are further included, wherein the plurality of limiting blocks 12 are connected to the fixing plate 2 and are arranged in one-to-one correspondence with the plurality of molding columns 3, a mounting gap 13 is formed between each limiting block 12 and a corresponding molding column 3, and the mounting gap 13 is communicated with the molding gap 10.

As shown in FIG. 6, the wire passes through the mounting gap 13, the molding gap 10 and the shearing gap 11 in sequence, the corresponding first shearing plate 91 and the second shearing plate 92 cut the wire to a suitable length, the wire arranged from the molding protrusion 5 to the shearing end of the first shearing plate 91 is set to be a first segment, while the rest of the wire is set to be a second segment; the molding protrusion 5 rotates along with the mounting plate 4 and winds and molds the first segment of the wire on the molding column 3, the second segment of the wire abuts against a limiting block 12, and the limiting block 12 supports the second segment of the wire, such that the first segment of the wire forms an O ring; the limiting block 12 is away from the rotating path of the molding protrusion 5, and does not affect the rotation of the molding protrusion 5 along with the mounting plate 4.

In some embodiments, the plurality of limiting blocks 12 are fixedly connected to the fixing plate 2.

In some embodiments, a plurality of molding columns 3 of different diameters, a fixing plate 2, a plurality of first shearing plates 91 and a plurality of limiting blocks 12 are integrally molded.

In one embodiment, the limiting block 12 is provided with a limiting surface 121, and the limiting surface is configured to position the wire in place.

In some embodiments, the limiting surface 121 is located in the same plane as the axis of the molding column 3. The second segment of the wire is tightly attached to the limiting surface 121, such that the straight line on which the second segment is located coincides with the diameter of the O ring wound from the first segment, thereby improving aesthetics.

In some embodiments, the axes of the limiting surface 121 and the molding column 3 may also be located in different planes.

In one embodiment, the molding protrusion 5 is provided with a guiding surface 51, and the molding gap 10 is formed between the guiding surface 51 and a corresponding molding column 3.

In some embodiments, the guiding surface 51 is an inclined surface, and the guiding surface 51 is inclined from an edge of the mounting plate 4 towards a direction close to the molding column 3, such that the molding gap 10 formed between the guiding surface 51 and the molding column 3 becomes gradually narrower in a direction opposite to the rotational direction of the mounting plate 4.

In one embodiment, an elastic member 14 is further included, wherein one end of the elastic member 14 is connected to the first plier arm 1, and the other end of the elastic member 14 is connected to the second plier arm 6, and under the action of the elastic member 14, the connecting part 7 has a tendency of rotating in a direction from the molding position to the initial position.

After the wire is processed, the first plier arm 1 and the second plier arm 6 are released, and under the action of the elastic member 14, the connecting part 7 rotates to the initial position, ready to process the next wire.

In one specific embodiment, the elastic member 14 may be selected from a torsion spring, a shrapnel or a component having elasticity.

Although embodiments of the present application are described in combination with the accompanying drawings, various modifications and variations can be made by those skilled in the art without departing from the spirit and scope of the present application, and such modifications and variations shall all fall within the scope limited by the appended application.

The invention claimed is:

1. A circle-producing plier, comprising:

a first plier arm with one end provided with a fixing plate, wherein a plurality of molding columns of different diameters are connected on the fixing plate, a mounting plate is rotatably connected on each of the molding columns, a molding protrusion is connected on each mounting plate, and a molding gap for molding a wire is arranged between the molding protrusion and a corresponding molding column; and a second plier arm rotatably connected to the first plier arm, wherein the second plier arm is provided with a connecting part, the connecting part is configured to be rotatably switchable between an initial position and a molding position, the connecting part is in motion-transmission connection with a plurality of mounting plates through a motion-transmission assembly, and in a process of the connecting part rotating from the initial position to the molding position, the molding protrusion molds a wire located in the molding gap onto the corresponding molding column to form an O ring.

2. The circle-producing plier according to claim 1, further comprising a shearing member, wherein the shearing member comprises a first shearing part and a second shearing part, the first shearing part is connected to the fixing plate, the second shearing part is connected to the connecting part, and when the connecting part is located at the initial position, a shearing gap configured to shear a wire is formed between the first shearing part and the second shearing part, and in a process of the connecting part rotatably switching from the initial position to the molding position, the first shearing part and the second shearing part cut the wire.

3. The circle-producing plier according to claim 2, wherein the first shearing part comprises a plurality of first shearing plates, the plurality of first shearing plates are connected to the fixing plate and are arranged in one-to-one correspondence with the plurality of molding columns; and the second shearing part comprises a plurality of second shearing plates, the plurality of second shearing plates are connected to the connecting part and are arranged in one-to-one correspondence with the plurality of first shearing plates, and the shearing gap is formed between each pair of correspondingly arranged first shearing plate and second shearing plate.

4. The circle-producing plier according to claim 3, wherein the distance between a shearing end of a first shearing plate and a corresponding molding protrusion is less than or equal to the perimeter of a cross section of the corresponding molding column.

5. The circle-producing plier according to claim 3, wherein the motion-transmission assembly comprises a plurality of gear wheels and a curved toothed plate, the plurality of gear wheels are correspondingly rotatably connected to the plurality of molding columns, the plurality of mounting plates are correspondingly connected to the plurality of gear wheels, the curved toothed plate is connected to the connecting part and meshes with the plurality of gear wheels, and the plurality of second shearing plates are connected to the curved toothed plate.

6. The circle-producing plier according to claim 1, wherein the plurality of mounting plates are provided with a plurality of mounting holes corresponding to the plurality of molding columns, and the plurality of mounting holes are correspondingly rotatably connected on the plurality of molding columns.

7. The circle-producing plier according to claim 1, further comprising a plurality of limiting blocks, wherein the plurality of limiting blocks are connected to the fixing plate and are arranged in one-to-one correspondence with the plurality of molding columns, a mounting gap is formed between each limiting block and a corresponding molding column, and the mounting gap is communicated with the molding gap.

8. The circle-producing plier according to claim 7, wherein the limiting block is provided with a limiting surface, and the limiting surface is configured to position the wire in place.

9. The circle-producing plier according to claim 1, wherein the molding protrusion is provided with a guiding surface, and the molding gap is formed between the guiding surface and a corresponding molding column.

10. The circle-producing plier according to claim 1, further comprising an elastic member, one end of the clastic member is connected to the first plier arm, and the other end of the elastic member is connected to the second plier arm, and under the action of the clastic member, the connecting part has a tendency of rotating in a direction from the molding position to the initial position.

* * * * *